(12) United States Patent
Miller (10) Patent No.: US 6,801,864 B2
(45) Date of Patent: Oct. 5, 2004

(54) SYSTEM AND METHOD FOR ANALYZING VIBRATION SIGNALS

(75) Inventor: Niel Miller, South Lyon, MI (US)

(73) Assignee: AB SKF, Gothenburg (SE)

( * ) Notice: Subject to any disclaimer, the term of this patent is extended or adjusted under 35 U.S.C. 154(b) by 175 days.

(21) Appl. No.: 09/991,580

(22) Filed: Nov. 15, 2001

(65) Prior Publication Data

US 2002/0169569 A1 Nov. 14, 2002

Related U.S. Application Data

(60) Provisional application No. 60/275,510, filed on Mar. 13, 2001.

(51) Int. Cl.[7] ................................................. G01L 7/00
(52) U.S. Cl. ...................................................... 702/56
(58) Field of Search ........................... 702/56; 327/559, 327/552, 551; 342/166, 174; 73/862, 593; 322/19; 346/134; 318/616

(56) References Cited

U.S. PATENT DOCUMENTS

| | | | |
|---|---|---|---|
| 4,664,083 A | | 5/1987 | Nix et al. |
| 5,445,028 A | * | 8/1995 | Bianchi et al. ............... 73/593 |
| 5,548,242 A | * | 8/1996 | Yasuda et al. ............... 327/559 |
| 6,546,814 B1 | * | 4/2003 | Choe et al. ............... 73/862.08 |

FOREIGN PATENT DOCUMENTS

| | | |
|---|---|---|
| DE | 43 08 796 A | 9/1994 |
| EP | 0 982 579 A1 | 3/2000 |
| WO | WO 94/14038 | 6/1994 |
| WO | WO 00/04361 | 1/2000 |

* cited by examiner

*Primary Examiner*—John Barlow
*Assistant Examiner*—Tung S Lau
(74) *Attorney, Agent, or Firm*—Knobbe, Martens, Olson & Bear, LLP (57) ABSTRACT

A system and method for analyzing vibrations signals thereby identifying damage or original manufacture defects in a vibrating device. In one embodiment of the invention, the method comprises collecting vibration signal data from at least one vibrating device, wherein the vibrating device includes at least an rotating inner ring, a rotating outer ring, and a plurality of rotating elements. The vibration signal data is enveloped and converted into a frequency domain signal. The amplitude of the frequency domain signal at certain defect frequencies is divided by a noise floor to provide a damage index. If the damage index exceeds an adjustable user-defined threshold, a warning is generated so as to alert a user of damage or original manufacture defects in the vibrating device.

31 Claims, 8 Drawing Sheets

SYSTEM AND METHOD FOR ANALYZING VIBRATION SIGNALS

RELATED APPLICATION

This application claims priority to and incorporates by reference, in its entirety, U.S. Application No. 60/275,510 to Miller, titled "BEARING DAMAGE INDEX ANALYSIS", filed Mar. 13, 2001.

BACKGROUND OF THE INVENTION

1. Field of the Invention

The field of the invention relates to a system and method for analyzing vibration signals. More particularly, the invention relates to a system and method for analyzing vibrations signals to identify damage or manufacturing defects in vibrating devices, especially rolling element bearings.

2. Description of the Related Technology

Detection of damage and/or original manufacture defects in bearings is a significant issue for owners of certain types of large equipment. For example, bearings can be damaged by vibrations from nearby machinery. This can occur, for example, when a backup motor is stored close to a primary motor already in operation. Vibration encountered during shipping can also damage electric motor bearings. In both cases, the bearing's rolling elements vibrate in place, breaking through the thin lubricating film separating them from the raceway. The resulting metal-to-metal contact creates wear depressions in the raceway (a condition called false brinelling). During operation, the bearing's rolling elements pass over these depressions, causing noise and reduced bearing life.

It has been reported that improper installation is the single biggest cause of motor bearing failures. Generally, these bearings are installed manually using a dead blow hammer. If mounting force is not applied properly as the bearing is pressed into the housing, the bearing can be damaged. Other problems include using the wrong lubricant or needlessly exposing bearings to dirt and contamination.

Once integrated with a device such as a motor, it can be very expensive to shut down the device in terms of lost production or use of the device and perform diagnostics on the device to determine whether there is a problem with the bearings.

Thus, there is a need for improved method of detecting defects in devices that contain rotating elements, such as bearings. The improved system and method should allow for the accurate detection of defects without requiring direct inspection of the bearings.

SUMMARY OF THE INVENTION

One aspect of the invention comprises a method of processing vibration signal data. The method comprises collecting vibration signal data from at least one vibrating device, wherein the vibrating device includes at least a rotating inner ring, a rotating outer ring, and a plurality of rotating elements. The process then envelops the vibration signal data. Enveloping includes applying the vibration signal data to a first filter, a rectifier, and a second filter. In one embodiment, the first filter is a high pass $4^{th}$ order Bessel filter having a high pass cut off frequency that is based, at least in part, upon the angular velocity of a shaft speed in the vibrating device. In one embodiment, the second filter is a $2^{nd}$ order band pass filter having a band pass low cut off frequency and a band pass high cut off frequency that are each based, at least in part, upon the angular velocity of the shaft speed. The process also includes converting the vibration signal to a frequency domain signal and determining a noise floor of a frequency domain signal. The step of determining excludes a portion of the frequency domain signal that is associated with damage or original manufacture defects in the rotating inner ring, the rotating outer ring, and the plurality of rotating elements. The process also includes determining the amplitudes of selected portions of the frequency domain signal, wherein the selected portions are associated with the frequency of rotation of the rotating inner ring, the rotating outer ring, and the rotating elements, and wherein determining the amplitudes includes determining the highest amplitudes in the portions of the frequency domain signal that are respectively associated with the defects in the rotating inner ring, the rotating outer ring, and the plurality of rotating elements. The process also includes dividing the determined amplitudes of the frequency domain signal by the determined noise floor and then comparing the result of the dividing to user-definable alarm levels. A warning is displayed if the result exceeds the user-definable alarm levels.

Another aspect of the invention comprises collecting vibration signal data from at least one vibrating device, wherein the vibrating device includes at least a rotating inner ring, a rotating outer ring, and a plurality of rotating elements, enveloping the vibration signal data, converting the vibration signal data into a frequency domain signal, determining a noise floor of a frequency domain signal, determining an amplitude of selected portions of the frequency domain signal, wherein the selected portions are associated with the frequency of rotation of the rotating inner ring, the rotating outer ring, and the rotating elements, and dividing the determined amplitudes of the frequency domain signal by the determined noise floor.

Yet another aspect of the invention comprises a system including a vibration monitor that is configured to determine the standard deviation of a time domain signal that is representative the vibrations of an electronic device, the computer determining the number of times the time domain signal exceeds a threshold, wherein the threshold is based at least in part upon the standard deviation.

Yet another aspect of the invention includes a method of detecting contaminants in bearing lubrication, the method comprising measuring time domain amplitudes of noise generated by a bearing, and counting excursions in amplitude above a predefined threshold.

Yet another aspect of the invention includes a method of enveloping a vibration signal, the method comprising: receiving a vibration signal that is indicative of vibrations in a vibrating device, and applying a filter to the vibration signal, wherein the filter has a cut off frequency that is based at least in part upon the angular velocity of a rotating in the vibrating device.

DETAILED DESCRIPTION OF EMBODIMENTS OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
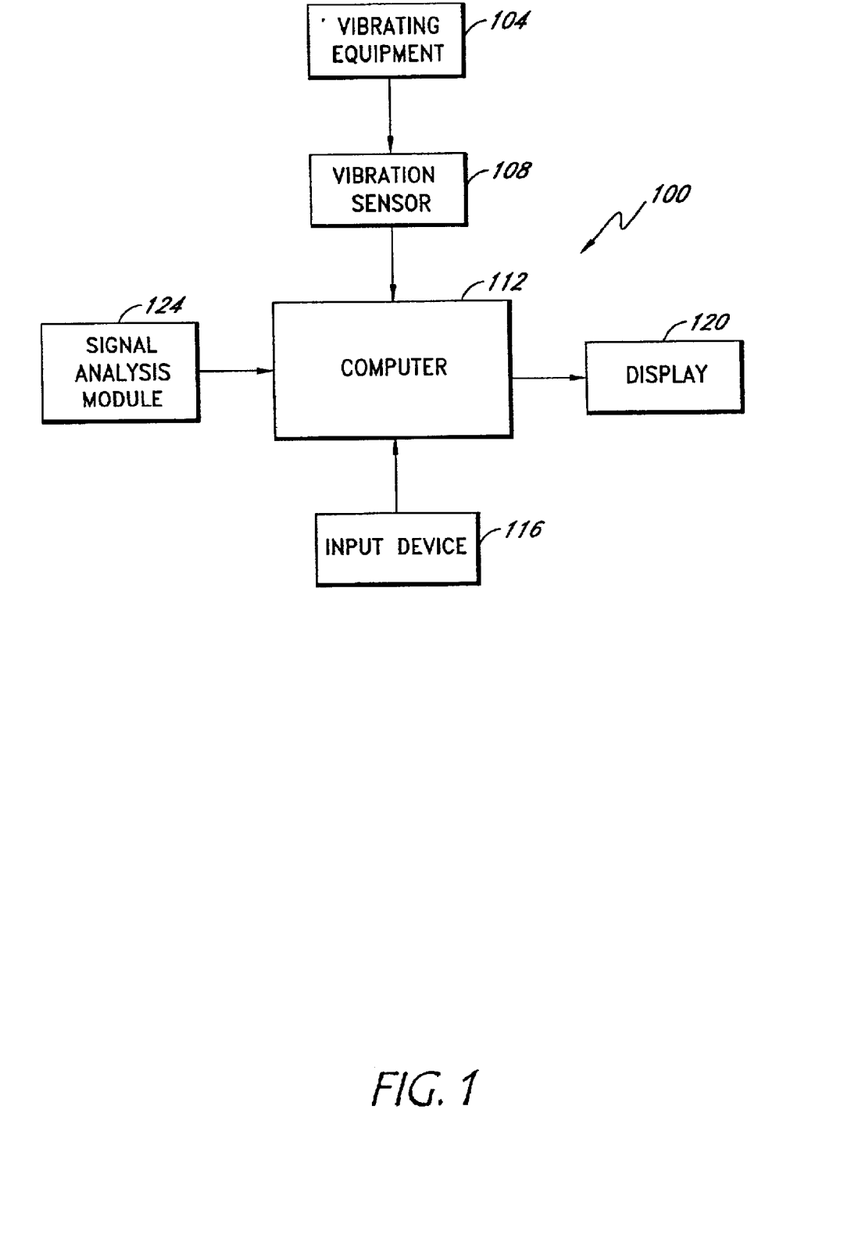
FIG. 1 is a block diagram illustrating a system for measuring vibration signals.

FIG. 1 is a block diagram illustrating an exemplary embodiment of a system 100 for analyzing vibration signals that are generated by vibrating equipment 104. In one embodiment of the invention, the vibrating equipment 104 includes one or more rotating or rolling elements in the vibrating equipment. In one advantageous embodiment, the bearings analyzed include a plurality of ball bearings, an inner ring supporting the bearings on an outside surface of the inner ring, and an outer ring supporting the bearings on an inner surface of the outer ring, and can include any part that rotates or rolls during equipment 104 operation. For convenience of description, both rotating and rolling elements are referred to below as "rotating elements."

Vibration signals from the vibrating equipment 104 are received by a vibration sensor 108. The vibration sensor 108 can include a transducer such as an accelerometer or a microphone for collecting the vibration signals. The data from the vibration sensor 108 is sent via a cable, radio frequency, or infrared connection to a computer 112. The computer 112 processes and/or displays the signals to assist the identification and quantification of defects in the rotating elements.

The computer 112 may include one or more microprocessors. The microprocessor may be any conventional general purpose single- or multi-chip microprocessor such as a Pentium® processor, a Pentium® Pro processor, a 8051 processor, a MPS® processor, a Power PC® processor, or an ALPHA® processor. In addition, the microprocessor may be any conventional special purpose microprocessor such as a digital signal processor. The computer 112 may be desktop, server, portable, hand-held, set-top, or any other desired type of configuration.

The computer 112 includes at least one input device 116. For example, the input device 116 may be a keyboard, rollerball, pen and stylus, mouse, or voice recognition system. The input device 116 may also be a touch screen associated with an output device. The user may respond to prompts on the display by touching the screen. Textual or graphic information may be entered by the user through the input device 116. The computer 112 will usually include at least one display 120 for displaying information to a user regarding the vibration signals.

The computer 112 may operate under the control of operating systems such as: UNIX, LINUX, Disk Operating System (DOS), OS/2, PalmOS, VxWorks, Windows 3.X, Windows 95, Windows 98, and Windows NT, Windows CE. The computer 112 includes a signal analysis module 124 for analyzing the vibration signals from the vibrating equipment. The signal analysis module 124 may be written in any programming language such as, but not restricted to, C, C++, BASIC, Pascal, Java, LabVIEW and Fortran and ran under the well-known operating system. C, C++, BASIC, Pascal, Java, LabVIEW, and Fortran are industry standard programming languages for which many commercial compilers can be used to create executable code.

The signal analysis module 124 is comprised of various submodules that may, for example, include various subroutines, procedures, definitional statements, and macros. Each of the submodules are typically separately compiled and linked into a single executable program. The processes that are undergone by each of the submodules modules may be arbitrarily redistributed to one of the other modules, combined together in a single module, or made available in a shareable dynamic link library. The signal analysis module 124 can reside in application space, in the operating system, or in combination thereof. Furthermore, in one embodiment of the invention, the signal analysis module 124 is implemented as hardware on the computer 112. Thus, as is used below, the term computer 112 and signal analysis module 124 are used interchangeably.

Figure 2:
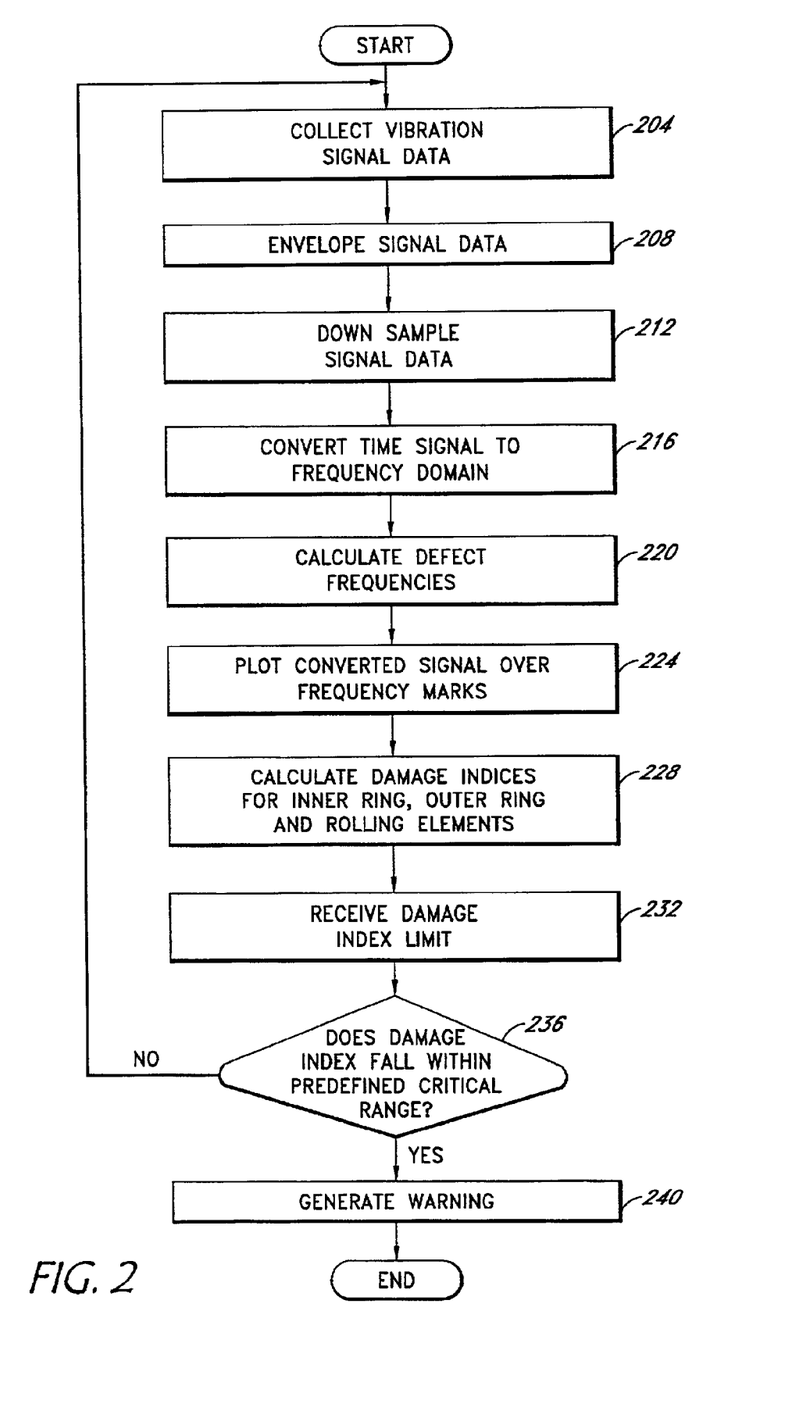
FIG. 2 is a flowchart illustrating a process of analyzing vibration signals from a vibrating device.

FIG. 2 is a flowchart illustrating a process of analyzing the vibration signal from the vibrating equipment 104 (FIG. 1). In one embodiment of the invention, the process that is shown by steps 204–240 is performed by the computer 112 (FIG. 1). Depending on the embodiment, additional steps may be added, others removed, and the ordering of the steps may be rearranged. For convenience, the following description describes a process of analyzing data that is collected from a device that includes a rotating outer ring, a plurality of rolling bearings, and a rotating inner ring. However, it is to be appreciated that the following process can be used with other types and numbers of rotating elements. Each of the following steps could be implemented as a sub-module of the signal analysis module 124.

Figure 5:
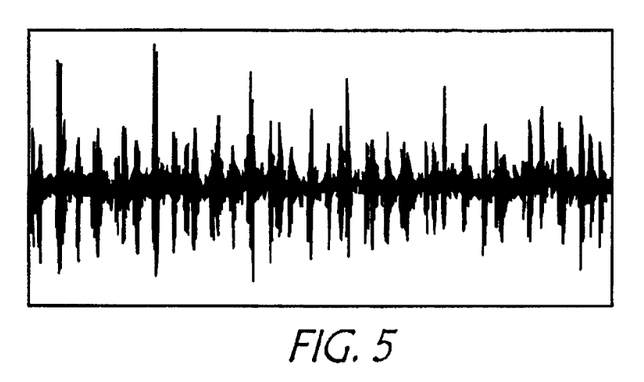
FIG. 5 is a screen display illustrating a time domain signal of vibration data gathered from the vibrating device of FIG. 1.

Starting at a step 204, vibration signal data is collected from the vibrating equipment 104 via the vibration sensor 108. As should be recognized by one of ordinary skill in the art, at this time, the vibration signal is a time domain signal. FIG. 5 is screen display graphically illustrating an exemplary time domain signal from a vibrating device. The time domain signal can either be collected and processed (steps 208–240) in a "live" mode or, alternatively, can stored for subsequent processing in a computer file.

Figure 6:
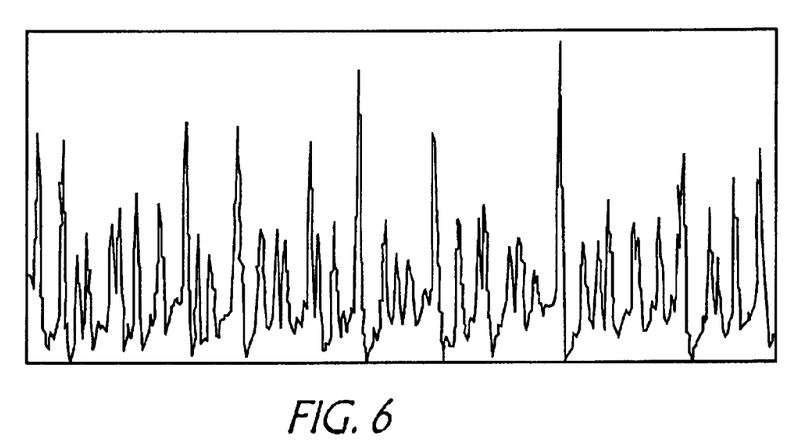
FIG. 6 is a screen display illustrating the time domain signal of FIG. 5 subsequent to being modified by an enveloping process.

Continuing to a step 208, the time domain signal is enveloped. An exemplary process of enveloping a time domain signal is described below with respect to FIG. 9. In one embodiment of the invention, enveloping includes passing the time domain signal through a high pass filter, a rectifier, and then a band pass filter. FIG. 6 is a screen display illustrating an exemplary signal that has been enveloped. In one embodiment, the computer 112 varies the filter cut off frequencies based upon a shaft speed that is rotating in the vibrating equipment 104. This provides an enveloper which can be used for all types of bearings and shaft speeds.

Next, at step 212, the enveloped time domain signal is downsampled by decimating the array that contains the enveloped time signal. The value of the decimating factor is also based upon shaft speed. In one embodiment of the invention, Equation 1, set forth below describes the decimation formula.

$$y_i = \left(\frac{1}{m}\sum_{k=0}^{m-1} x_{(i*m)+k}\right)$$

for i=0,1,2, . . . , size −1

$$size = trunc\left(\frac{n}{m}\right)$$

The variable "m" is the decimating factor and the variable "n" is the number of elements in the array. The "size" variable indicates the number of elements in the decimated array. In one embodiment of the invention, the process for decimating the time domain signal is as follows. First the shaft speed (in RPM) is divided by 1800. This result is rounded to the nearest integer. Next, the log base 2 of the result is computed, and rounded to the nearest integer. Next, the value of 2 raised to the power of the result is computed. Finally, the decimation factor is calculated by dividing 32 by the previous result.

Table 1 below shows these steps and the resulting values obtained at each step with respect to different RPM values.

TABLE 1

| OPERATION | SAMPLE VALUES | | | | | | |
|---|---|---|---|---|---|---|---|
| RPM | 30 | 900 | 901 | 1800 | 2699 | 2700 | 8101 |
| N1 = RPM/1800 | .0016 | .5 | .5005 | 1 | 1.499 | 1.50 | 4.5006 |
| N2 = N1 converted to a 32-bit integer | 0 | 0 | 1 | 1 | 1 | 2 | 5 |
| N3 = N2 + 1 | 1 | 1 | 2 | 2 | 2 | 3 | 6 |
| N4 = Logarithm Base 2 of N3 | 0 | 0 | 1 | 1 | 1 | 1.585 | 2.585 |
| N5 = 2 raised to the power of rounded N4 | 1 | 1 | 2 | 2 | 2 | 4 | 8 |
| Decimating Factor = 32/N5 | 32 | 32 | 16 | 16 | 16 | 8 | 4 |

Down sampling reduces the maximum spectrum frequency when the time signal is converted into the frequency domain.

Proceeding to a step 216, the enveloped time signal is converted to frequency domain by using Fast Fourier Transforms. Next, at step 220, the specific defect frequencies for the bearing and shaft speed are then calculated. For further information on calculating defect frequencies, one can reference Tedric A. Harrus, Rolling Bearing Analysis (3rd Edition, 1991).

Moving to a step 224, the converted time signal is plotted over frequency markers set at the calculated defect frequencies and at 1st, 2nd, and 3rd harmonics of the defect frequencies for inner ring defects, outer ring defects, and rolling element defects in the vibrating equipment 104.

Next, at a step 228, damage indices for inner ring, outer ring, and rolling elements are computed. In one embodiment of the invention, to determine a damage index for a selected defect frequency, the amplitude at the selected defect frequency is divided by a noise floor of the frequency domain signal. One advantageous process of determining the noise floor is described in further detail below with respect to step 304 of FIG. 3. One advantageous process of determining the amplitude of defect frequencies is described in further detail below with respect to step 308 of FIG. 3. Although dividing by the noise floor has been found especially advantageous, it is noted that instead of dividing the amplitude by the noise floor, other mathematical operations such as subtraction may be used in some embodiments to calculate the damage index for a selected frequency.

Continuing to a step 232, the computer 112 retrieves a damage index limit which may be predefined by the user. The damage index limit is used in conjunction with the noise floor and the frequency domain signal to determine whether there is a malfunction in the rotating elements.

Moving to a decision step 236, the computer 112 may then determine whether the damage index exceeds the damage index limit. In one embodiment, therefore, if the amplitude of the frequency domain signal exceeds X times the noise floor, wherein X is the damage index limit, an alarm is raised. If the damage index does not exceed the limit, the computer 112 returns to the step 204 to collect additional vibration signal data.

Referring again to the decision step 236, if damage index does fall within the predefined critical range, the computer 112 proceeds to a step 240 and generates a warning. A description of the output of the computer 112 is described in further detail below with respect to FIG. 4.

Figure 3:
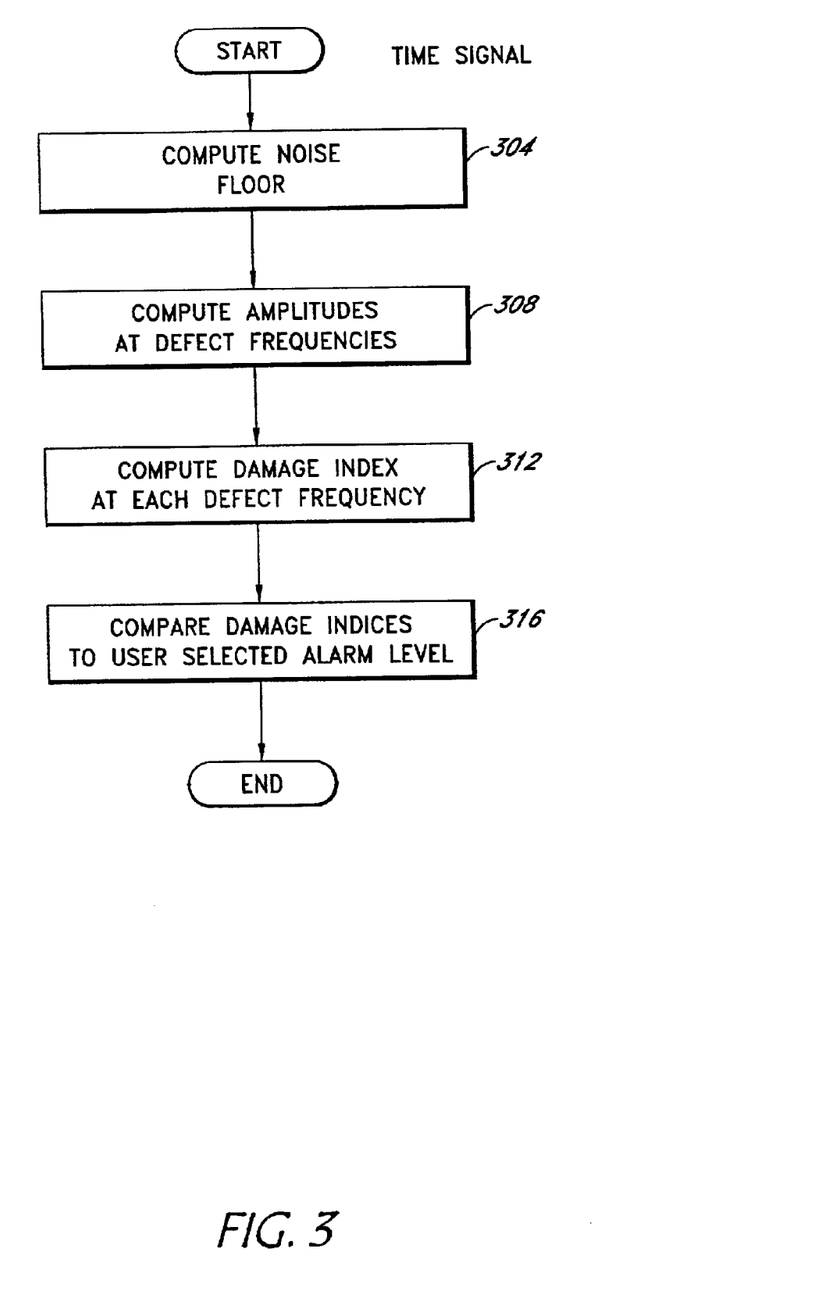
FIG. 3 is a flowchart illustrating a process of determining whether a vibration signal indicates that there is damage or original manufacture defects in the vibrating device of FIG. 1.

FIG. 3 is a flowchart illustrating in further detail the acts that occur in blocks 228 to 240 of FIG. 2 in some advantageous embodiments of the invention. Depending on the embodiment, additional steps may be added, others removed, and the ordering of the steps may be rearranged. Each of the following steps could be implemented as a submodule of the signal analysis module 124.

Starting at a step 304, a noise floor is calculated for the frequency domain signal. In one embodiment, the noise floor is determined by taking the root mean square (rms) average of the frequency domain signal across the frequency range, excluding data from windows centered on defined defect frequencies. In one embodiment of the invention for determination of the noise floor, the windows are centered at a known defect frequency and span +/−3 Hz from the known defect frequency. In another embodiment of the invention, the width of the window is a user-provided value, such as a bandwidth factor (discussed below). Furthermore, in one embodiment of the invention, to determine the noise floor, the very low end of the spectrum is removed, i.e., amplitudes of frequencies less than ¼ shaft speed or 5 Hz, whichever is greater, are ignored. Continuing to a step 308, the amplitudes at defect frequencies are detected. In one embodiment, a bandwidth factor is used at least in part to determine the amplitude value assigned to a defect frequency. In one embodiment, the bandwidth of the defect frequencies has at its lower end the value of the defect frequency minus 1.5 times the bandwidth factor and has at its higher end the value of 1.5 times the bandwidth factor above the defect frequency. The amplitude is determined by identifying the highest amplitude in this range.

Next, at a step 312, a damage index is calculated for each defect frequency. The damage index is the amplitude (determined in step 308) divided by the noise floor. This process normalizes defect frequency excitation across various bearing types, loads, speeds, and other application parameters.

Moving to a step 316, the damage index is compared to user-selected alarm levels, i.e., the damage index limit. This process is described in greater detail above with respect to steps 236 and 240 in FIG. 2.

Figure 4:
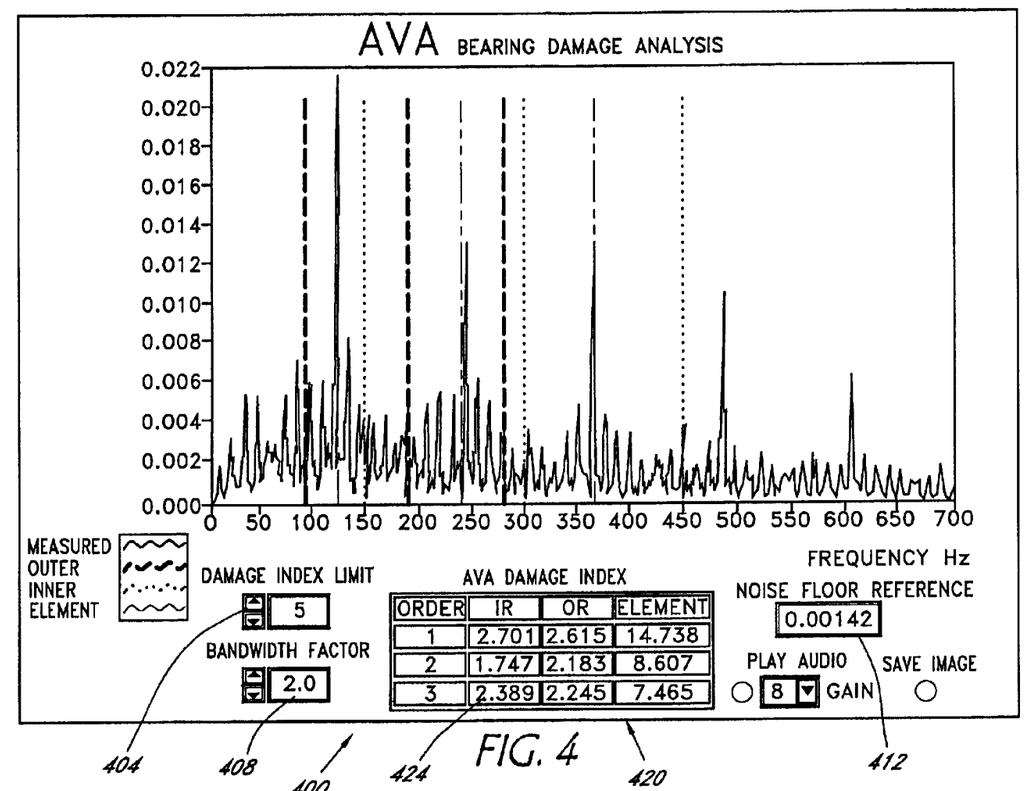
FIG. 4 is an screen display illustrating exemplary frequency domain signal that generated from the vibration signal of the vibrating device of FIG. 1.

FIG. 4 illustrates an exemplary screen display 400 that is generated by the computer 112 on the display 120. Depending on the embodiment, the placement of the fields, the controls, and windows can be rearranged and/or modified.

In the embodiment of FIG. 4, the screen display 400 includes a damage index limit input field 404 that allows the user to set the damage index limit (see for example step 232 of FIG. 2). The screen display 400 also includes a bandwidth factor input field 408 for allowing the user to define the portions of the frequency domain signal that are associated with a selected defect frequency (see for example step 308 of FIG. 3). The screen display also includes a noise floor display field 412 that displays the noise floor (calculated in step 304 of FIG. 3).

The screen display 400 also includes a plot of the frequency domain signal. A plurality of markers show the $1^{st}$, $2^{nd}$ and $3^{rd}$ harmonics of the defect frequency of the plurality of rotating elements, the inner ring, and the outer ring. Furthermore, the damage indices for the first, second, and third harmonics of each component's defect frequency are shown in a table 420 having a plurality of table fields 424. Each field in the table fields 424 corresponds to a selected type of defect. In one embodiment of the invention, if the value of a selected damage index is 80% of the damage index limit or below, the background of the table field showing the damage index is green, if the index value is between 80% and 100% of the damage index limit, the background of table field is yellow, and if the value is equal to or exceeds 100% value of the damage index limit, background of the table field is red.

Figure 7:
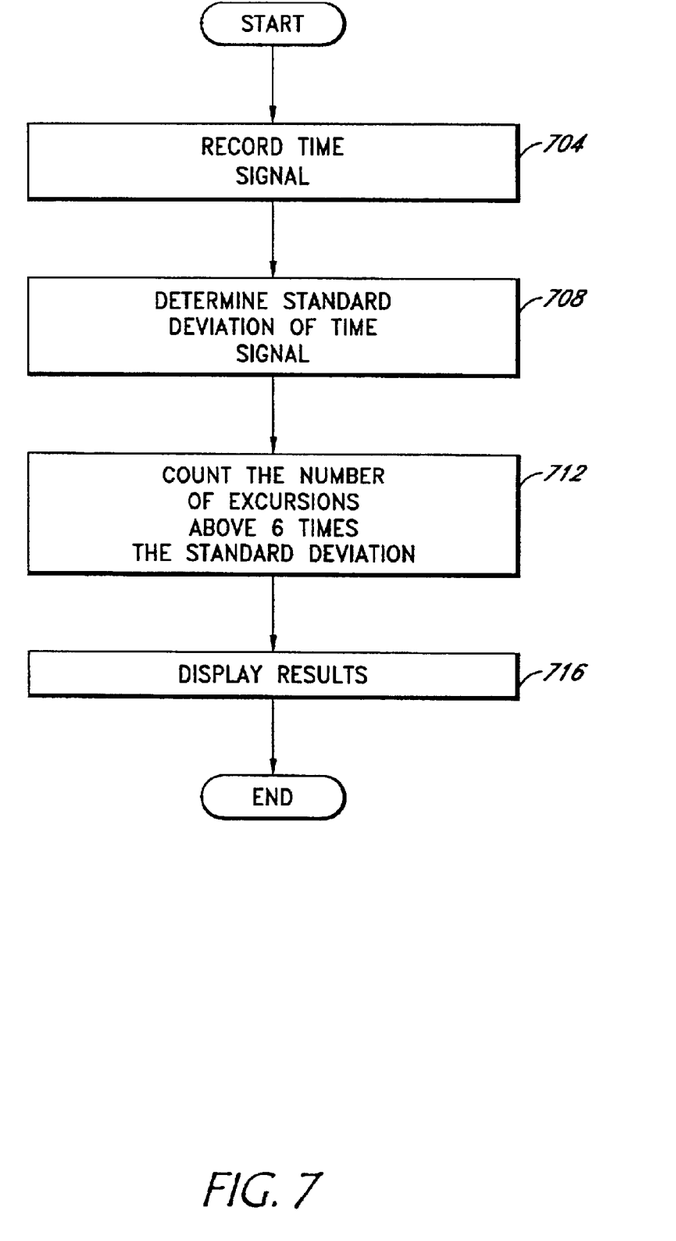
FIG. 7 is a flowchart illustrating another process of determining whether a vibration signal indicates that there is damage or original manufacture defects or contamination particles in the vibrating device of FIG. 1.

FIG. 7 is a flowchart illustrating another method for processing time domain vibration signals to detect bearing faults. Depending on the embodiment, additional steps may be added, other removed, and the ordering of the steps may be rearranged. Each of the following steps could be implemented as a submodule of the signal analysis module 124.

It is noted that certain aspects of bearing vibration are better examined in the time domain rather than the frequency domain. The inventors have found that this is the case with lubricant contamination since the over rolling of a contaminant particle occurs at an irregular time interval and therefore does not excite any specific frequency. It has been determined that examining the time signal for excursions that exceed six times the standard deviation (6σ) of the data points in the time signal can give a good relative measure of contamination. The 6 Sigma value for a time signal has been used successfully to characterize the audible sound of some applications (linear actuators). It is noted that both the RMS level of the time signal can also be a good measure of overall vibration level.

Starting at a step 704, the time domain signal is recorded from the vibrating equipment 104. Optionally, the user may select whether enveloping should be performed on the time domain signal. Impulse type events like the over rolling of contamination or localized surface defects are exaggerated with enveloping. A time signal index, the maximum peak to peak value can be used as an indication of bearing damage or contamination.

Continuing to a step 708, the standard deviation of the time signal is determined. Next, at a step 712, the number of excursions above a certain threshold is calculated. In one embodiment of the invention, the threshold is 6 times the standard deviation. Proceeding to a step 7816, the determined number of excursions is displayed to the user.

Figure 8:
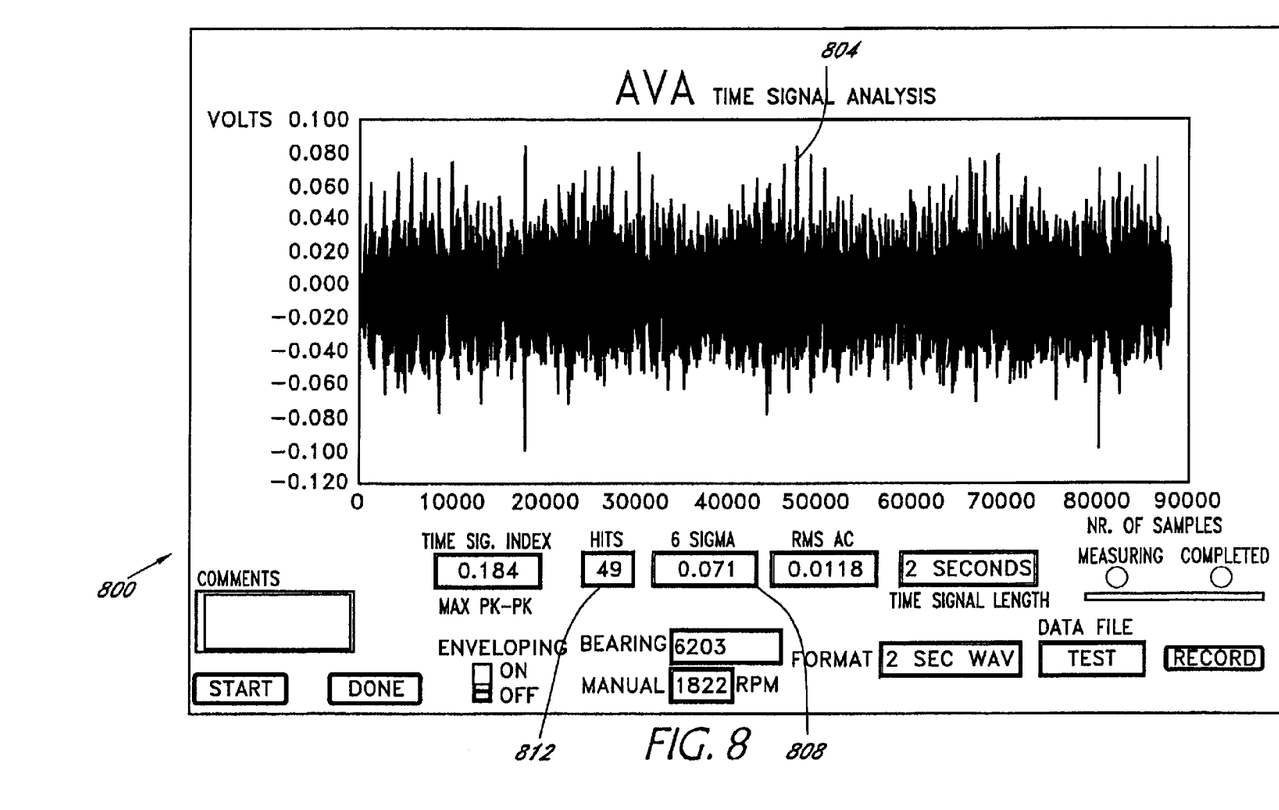
FIG. 8 is a screen display illustrating an exemplary time domain signal that is gathered from the vibrating device of FIG. 1.

FIG. 8 illustrates a screen display 800 which is usefull when using the method of FIG. 7. The screen display 800 includes a graph 804 that illustrates a time domain signal that was collected from a vibrating device. The screen display 800 includes a threshold display field 808 indicating a certain threshold, e.g., six times the standard deviation of the time domain signal. Furthermore, the screen display 800 includes a display field 812 identifying the number of times the time domain signal exceeds the threshold shown by the display field 808. Using this information displayed by the display field 812, it is possible for a field engineer to estimate the likelihood that there is a problem in the lubricant of a vibrating device.

Figure 9:
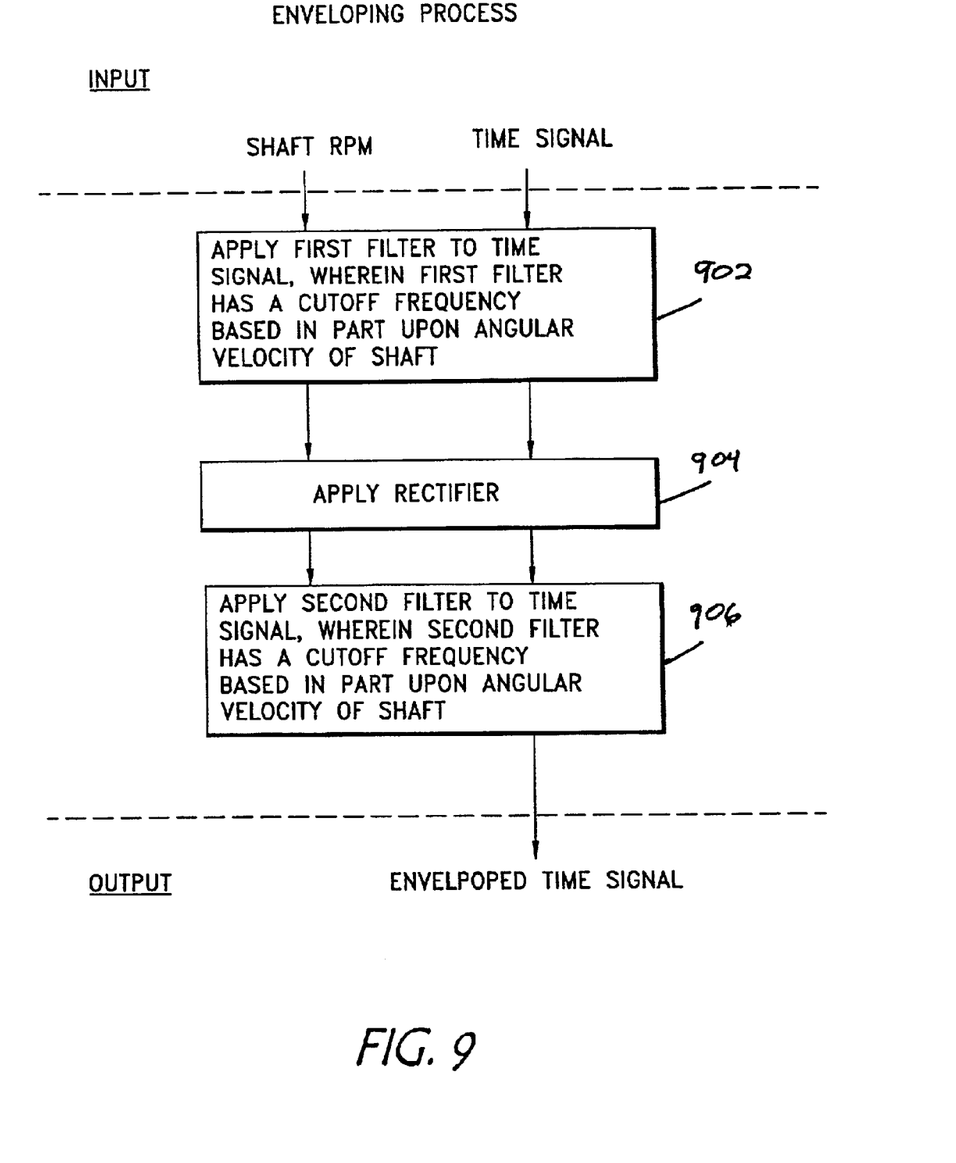
FIG. 9 is a flowchart illustrating an enveloping process.

FIG. 9 is a flowchart illustrating a process of enveloping a time domain signal. FIG. 9 illustrates in further detail the steps that occur in one embodiment of the invention with respect to step 208 in FIG. 2. It is to be appreciated that other enveloping processes may also be employed. Further more, depending on the embodiment, additional steps may be added, others removed, and the ordering of the steps may be rearranged.

Starting at a step 902, the computer 112 applies a first filter to the time domain signal. As discussed above, the time domain signal is indicative of vibrations in a rotating device. In one embodiment, the first filter is a $4^{th}$ order Bessel high pass filter that has a high pass cut off frequency that is based, at least in part, upon the shaft speed. In one embodiment of the invention, the high pass cut off frequency is defined below by Equation No. 2

$$\text{High Pass Cut Off Frequency} = (\text{angular velocity of shaft}/k1)*300, \quad (2)$$

wherein angular velocity=the revolutions per minute of the shaft, and k1=the standard angular velocity of the shaft.

In one embodiment of the invention, the valve is 1800 RPM.

Continuing to a step 904, the computer 112 applies a rectifier to the time domain signal. In one embodiment, the rectifier is, as is know in the art, an absolute value operator rectifier.

Next, at a step 906, the computer 112 applies a second filter to time domain signal. In one embodiment, the first filter is a $2^{nd}$ order Bessel band pass filter that has a high band and low band pass cut off frequencies that are each based, at least in part, upon the shaft speed. In one embodiment of the invention, the high band and low band pass cut off frequencies are defined respectively below by Equation Nos. 3 and 4.

$$\text{High Pass Cut Off Frequency} = \text{angular velocity of shaft}/k1*600, \quad (3)$$

$$\text{Low Pass Cut Off Frequency} = \text{angular velocity of shaft}/k1*25, \quad (4)$$

wherein angular velocity=the revolutions per minute of the shaft, k1=the standard angular velocity of shaft.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method, comprising:
   collecting vibration signal data from at least one vibrating device, wherein the vibrating device includes at least a rotating inner ring, a rotating outer ring, and a plurality of rotating elements;
   enveloping the vibration signal data, wherein enveloping the vibration signals includes applying the vibration signal data to a first filter, a rectifier, and a second filter, wherein the first filter is a high pass $4^{th}$ order Bessel filter having a high pass cut off frequency that is based, at least in part, upon the angular velocity of a shaft speed in the vibrating device, and wherein the second filter is a $2^{nd}$ order band pass filter having a band pass low cut off frequency and a band pass high cut off frequency that are each based, at least in part, upon the angular velocity of the shaft speed;
   converting the vibration signal to a frequency domain signal;
   determining a noise floor of a frequency domain signal, wherein determining excludes a portion of the frequency domain signal that is associated with damage or original manufacture defects in the rotating inner ring, the rotating outer ring, and the plurality of rotating elements;
   determining the amplitudes of selected portions of the frequency domain signal, wherein the selected portions are associated with the frequency of rotation of the rotating inner ring, the rotating outer ring, and the rotating elements, and wherein determining the amplitudes includes determining the highest amplitudes in the portions of the frequency domain signal that are respectively associated with the defects in the rotating inner ring, the rotating outer ring, and the plurality of rotating elements;
   dividing the determined amplitudes of the frequency domain signal by the determined noise floor;
   comparing the result of the dividing to user-definable alarm levels; and
   displaying a warning if the result exceeds the user-definable alarm levels.

2. A method, comprising:
   collecting vibration signal data from at least one vibrating device, wherein the vibrating device includes at least a rotating inner ring, a rotating outer ring, and a plurality of rotating elements;
   enveloping the vibration signal data;
   converting the vibration signal to a frequency domain signal;
   determining a noise floor of a frequency domain signal, wherein determining excludes a portion of the frequency domain signal that is associated with damage or original manufacture defects in the rotating inner ring, the rotating outer ring, and the plurality of rotating elements;
   determining the amplitudes of selected portions of the frequency domain signal, wherein the selected portions are associated with the frequency of rotation of the rotating inner ring, the rotating outer ring, and the rotating elements, and wherein determining the amplitudes includes determining the highest amplitudes in the portions of the frequency domain signal that are respectively associated with the defects in the rotating inner ring, the rotating outer ring, and the plurality of rotating elements;
   dividing the determined amplitudes of the frequency domain signal by the determined noise floor;
   comparing the result of the dividing to user-definable alarm levels; and
   displaying a warning if the result exceeds the user-definable alarm levels.

3. The method of claim 2, wherein enveloping the vibration signal data comprises applying at least one filter having at least one filter cut off frequency that is based upon the angular velocity of a shaft in the vibrating device.

4. A method, comprising:
   collecting vibration signal data from at least one vibrating device;
   enveloping the vibration signal data;
   converting the vibration signal data into a frequency domain signal;
   determining a noise floor of a frequency domain signal;
   determining an amplitude of at least one portion of the frequency domain signal; and
   dividing the determined amplitude of the frequency domain signal by the determined noise floor.

5. The method of claim 4, wherein enveloping the vibration signal data comprises applying at least one filter having at least one filter cut off frequency that is based upon the angular velocity of a shaft in the vibrating device.

6. A method, comprising:
   collecting vibration signal data from at least one vibrating device, wherein the vibrating device includes at least a rotating inner ring, a rotating outer ring, and a plurality of rotating elements;
   enveloping the vibration signal data;
   converting the vibration signal data into a frequency domain signal;
   determining a noise floor of a frequency domain signal;
   determining an amplitude of selected portions of the frequency domain signal, wherein the selected portions are associated with the frequency of rotation of the rotating inner ring, the rotating outer ring, and the rotating elements; and
   dividing the determined amplitudes of the frequency domain signal by the determined noise floor.

7. The method of claim 6, wherein enveloping the vibration signal data comprises applying at least one filter having at least one filter cut off frequency that is based upon the angular velocity of a shaft in the vibrating device.

8. A method of claim 6, additionally comprising:
   comparing the result of the dividing to user-definable alarm levels; and
   displaying a warning if the result if the result exceeds the user-definable alarm levels.

9. A program storage device storing instructions that when executed perform the method comprising:
   determining a noise floor of a frequency domain signal that is representative of noise generated from a vibrating device;
   determining the amplitude of at least a portion of the frequency domain signal; and
   dividing the determined amplitude of the frequency domain signal by the determined noise floor.

10. A system, comprising:
  means for determining a noise floor of a frequency domain signal that is representative of noise generated from a vibrating device;
  means for determining an amplitude of at least one portions of the frequency domain signal; and
  means for dividing the determined amplitude of the frequency domain signal by the determined noise floor.

11. The system of claim 10, wherein the means for determining the noise floor includes means for determining an average of at least a portion of the frequency domain signal.

12. The system of claim 11, wherein the means for determining a noise floor excludes from the determination selected portions of the frequency domain signal that relate to defect frequencies.

13. The system of claim 10, additionally comprising means for converting a time domain signal into the frequency domain signal.

14. The system of claim 10, additionally comprising means for comparing the result of the dividing to user-definable alarm levels.

15. The system of claim 10, wherein the user definable levels indicate damage in a rotating device.

16. A system, comprising:
  a vibrating device;
  a transducer configured to collect data about the vibrating device; and
  a computer configured to determine a noise floor of a frequency domain signal that is generated from the collected data, wherein the computer is also configured to determine an amplitude of the frequency domain signal at least one portion of the frequency domain signal, and wherein the computer is also configured to divide the determined amplitude of the frequency domain signal by the determined noise floor.

17. A method, comprising:
  determining a noise floor of a frequency domain signal;
  determining an amplitude of at least one portion of the frequency domain signal; and
  dividing the determined amplitude of the frequency signal by the determined noise floor.

18. The method of claim 17, wherein determining a noise floor includes determining an average of at least a portion of the frequency domain signal.

19. The method of claim 17, additionally comprising converting a time domain signal into the frequency domain signal.

20. The method of claim 17, additionally comprising comparing the result of the dividing to user-definable alarm levels.

21. The method of claim 17, wherein determining the amplitude includes identifying the highest amplitude in a range of frequencies in the frequency domain signal.

22. The method of claim 17, wherein the range of frequencies is user-definable.

23. The method of claim 18, wherein determining a noise floor excludes from the determination selected portions of the frequency domain signal that relate to defect frequencies.

24. The method of claim 20, wherein the user definable levels indicate damage in a rotating device in an electronic device.

25. A method of detecting bearing defects, the method comprising:
  measuring vibration amplitudes at one or more bearing defect frequencies;
  measuring vibration amplitudes of frequencies other than the bearing defect frequencies to define a noise floor;
  dividing the vibration amplitude at bearing defect frequencies by the noise floor to produce a normalized defect frequency amplitude compensated for non-damage related vibration; and
  comparing the noise compensated vibration measurement to a predefined threshold value.

26. A system, comprising:
  a noise floor determination module configured to determine a noise floor of a frequency domain signal, wherein determining excludes a portion of the frequency domain signal that is associated with damage or original manufacture defects in at least one of the following: a rotating ring and at least one of a plurality of rotating elements.

27. A method of detecting bearing defects, the method comprising:
  measuring vibration amplitudes at one or more bearing defect frequencies;
  measuring vibration amplitudes of frequencies other than the bearing defect frequencies to define a noise floor;
  dividing or subtracting the nose floor from the vibration amplitudes at the bearing defect frequencies to produce a noise compensated vibration measurement at the bearing defect frequencies; and
  comparing the noise compensated vibration measurement to a predefined threshold value.

28. A method of enveloping a vibration signal, the method comprising:
  receiving a vibration signal that is indicative of vibrations in a vibrating device; and
  applying a filter to the vibration signal, wherein the filter has a cut off frequency that is based at least in part upon the angular velocity of a rotating shaft in the vibrating device.

29. The method of claim 28, wherein the filter is a high pass or a band filter.

30. The method of claim 28, additionally comprising applying an absolute value rectifier to the filtered vibration signal.

31. The method of claim 28, additionally comprising applying a second band pass filter to the filtered vibration signal, also using high and low cut off frequencies that are based at least in part upon the angular velocity of the rotating shaft in the vibrating device.

* * * * *